United States Patent [19]

Antes

[11] Patent Number: 5,032,003
[45] Date of Patent: Jul. 16, 1991

[54] OPTICALLY VARIABLE SURFACE PATTERN

[75] Inventor: Gregor Antes, Zurich, Switzerland

[73] Assignee: Landis & Gyr Betriebs AG, Zug, Switzerland

[21] Appl. No.: 442,016

[22] Filed: Nov. 28, 1989

[30] Foreign Application Priority Data

Dec. 12, 1988 [CH] Switzerland .............................. 04576

[51] Int. Cl.⁵ .......................... G02B 5/18; B42D 15/00
[52] U.S. Cl. .............................. 350/162.18; 350/3.75; 283/91
[58] Field of Search .................... 283/91, 93, 902, 101, 283/100, 109, 108; 350/162.18, 144, 162.23, 162.24, 162.17, 321, 162.2, 3.6, 3.61, 3.7, 3.73, 3.75, 3.78, 3.79, 106, 109, 130, 131; 428/916, 29, 30; 40/453, 454

[56] References Cited

U.S. PATENT DOCUMENTS

| | | | |
|---|---|---|---|
| 734,135 | 7/1903 | Porter | 428/30 |
| 3,516,730 | 6/1970 | Wood | 350/162.18 |
| 3,567,561 | 3/1971 | Wood | 428/30 |
| 4,011,435 | 3/1977 | Phelps et al. | 235/61.11 E |
| 4,094,575 | 6/1978 | Kellie | 350/3.67 |
| 4,184,700 | 1/1980 | Greenway | 283/91 |
| 4,417,784 | 11/1983 | Knop et al. | 283/91 X |
| 4,568,141 | 2/1986 | Antes | 350/3.61 |
| 4,588,212 | 5/1986 | Castagnoli | 283/91 |

FOREIGN PATENT DOCUMENTS 579730 7/1958 Italy ........................................ 40/453
2126949 4/1984 United Kingdom .

OTHER PUBLICATIONS

Maystre, D., Neviere, M., and Petit, R., *Electromagnetic Theory of Gratings*, Springer Verlag, Berlin Heidelberg, N.Y., 1980, pp. 159-225.
Optical Holography, Robert J. Collier, et al, Academic Press, Inc., Orlando, Fla., 1971, pp. 523-541.

Primary Examiner—Bruce Y. Arnold
Assistant Examiner—David R. Parsons
Attorney, Agent, or Firm—Marmorek, Guttman & Rubenstein

[57] ABSTRACT

An article of manufacture including an optically variable surface pattern is disclosed. The optical surface pattern makes visible one out of a plurality of N image representations for each one out of N predetermined viewing directions. The surface pattern comprises M grating elements, each of the grating elements being divided into N grating element sub-portions. Each of the N sub-portions of each grating element contains a diffraction element in the form of a relief structure with predetermined parameters for diffracting incident light. Each of the sub-portions of each grating element thereby corresponds to one pixel of one of the N image representations, so that one of the N image representations is visible from each of said predetermined viewing directions.

14 Claims, 1 Drawing Sheet

OPTICALLY VARIABLE SURFACE PATTERN

FIELD OF THE INVENTION

The present invention relates to an optically variable surface pattern embossed into a support.

BACKGROUND OF THE INVENTION

Such optically variable surface patterns with microscopic relief structures can be used, for example, to protect against forgery and to mark objects of all kind in a prominent manner, being useful in particular with securities, identification papers, means of payment and similar objects to be protected.

The embossed relief structures with an optically active covering cause diffraction of incident light falling thereon. The diffraction characteristics of these relief structures are determined, among other things, by the spacial frequency, i.e. by the number of lines per millimeter, by the profile configuration of the relief structure and by the amplitude or differences in height in the relief structure as well as by the azimuthal orientation of the relief structure on the object to be protected.

The relief structures can be provided with cross-sectional configurations of known periodic functions for example, with spacial frequencies of over 10 lines per mm that are effective for the diffraction of visible light. Due to manufacturing limitations, the practical usable range is limited to approximately 5000 lines/mm. However, cross-sectional configurations with aperiodic functions containing locally a mixture of spacial frequencies in that range, such as matte structures for instance, can also be used. The height difference selected for such relief structures lies typically between 50 nm and 10,000 nm.

The diffraction properties of the different relief structures are described in R. Petit, Electromagnetic Theory of Gratings, Springer Verlag, Berlin Heidelberg New York 1980, for example.

These structures can be produced economically by deforming a layer of synthetic thermoplastic material by means of a heatable embossing die which carries a negative of the desired relief structure as is described in U.S. Pat. No. 4,184,700.

An optically variable surface pattern as well as another method for the production of a master structure for the embossing die to emboss such surface patterns are described in the Swiss Patent application 00805/88-4 which corresponds to U.S. Pat. No. 311,596 filed on Feb. 15, 1989.

On the other hand holograms are known for the production of three-dimensional impressions. The optical information concerning every point of a holographically registered, diffusely reflecting object is distributed over the entire active surface so that a reduction of the hologram surface reduces the visible image portion only to an insignificant degree but reduces the usable range of the angle of view.

A process to obtain a relief structure from a hologram is described in U.S. Pat. No. 4,094,575. This relief structure can be embossed into a film of synthetic material and can be reproduced many times. Such structures are difficult to identify under illumination by means of area lights such as fluorescent lights, for example.

It is an object of the present invention to provide a planar light-modifying pattern changing in a predetermined manner with at least two different graphically formed images visible under different angles of view which is difficult to copy and the authenticity of which can be recognized under normal light, whether daylight or artificial light, even by persons not specially trained.

SUMMARY OF THE INVENTION

The present invention is an article of manufacture including an optically variable surface pattern. The optical surface pattern makes visible one out of a plurality of N image representations for each one of N predetermined viewing directions. The surface pattern comprises M grating elements, each of the grating elements being divided into N grating element sub-portions. Each of the N sub-portions of each grating element contains a diffraction element in the form of a relief structure with predetermined parameters for diffracting incident light. Each of the sub-portions of each grating element thereby corresponds to one pixel of one of the N representations. In this manner each of the M grating elements contained a pixel from each of the N image representations, which pixel is visible only from the appropriate viewing direction Therefore, one of the N image representations is visible from each of said predetermined viewing directions.

DETAILED DESCRIPTION OF THE INVENTION

Figure 1:
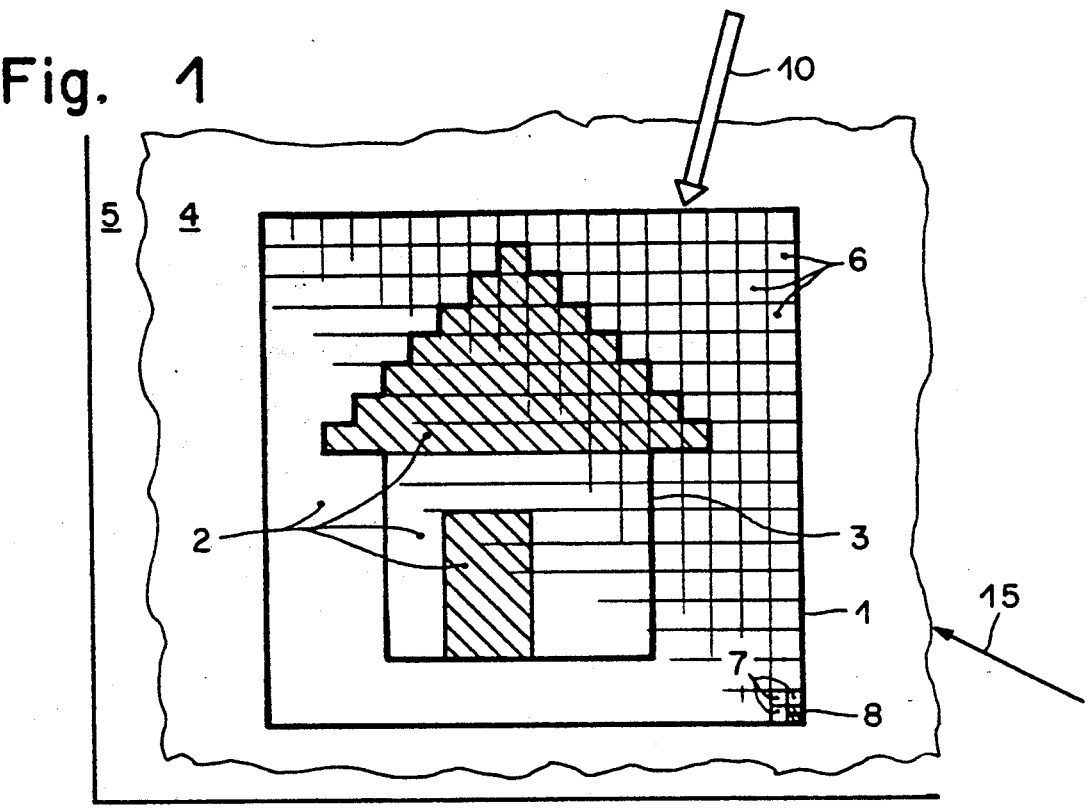
FIG. 1 shows a surface pattern embossed into a support with a graphic image which is divided into surface portions and grating surface elements.

In FIG. 1 a randomly formed border of a surface pattern is designated with 1. In a graphically constituted image representation 3, different surface portions are designated with 2. A support of the surface pattern is designated with 4. An object with a surface pattern as a protection element is designated with 5. Each of a plurality of grating surface elements is designated with 6. Several sub-portions of a grating surface element 6 are designated with 7, and a diffraction element is designated with 8

In the embodiment shown as an example, a house is represented by the three surface portions 2, showing the roof, the wall and the door, and a background is represented by means of a fourth surface portion 2. Each surface portion 2 is divided into grating elements 6, the borders between said surface portions 2 and the border 1 being pieced together from the borders of the grating elements 6. Preferably all surface portions 2 comprise grating elements 6 of identical size.

The surface pattern can also be only a part of a larger, graphically represented motif produced by some other technology, for instance. The border 1 is surrounded at least in part by that motif. The parts of the motif not belonging to the surface pattern can be produced according to the process described in the above-identified U.S. Pat. No. 311,596 for instance, or by means of a conventional printing process.

The entire surface pattern is composed of M grating elements 6, where M has a value of at least two. For graphically difficult surface patterns a field delimited by the border 1 should be subdivided into a large quantity of grating elements 6 so that the grating elements 6 may no longer be seen as interferences by the naked eye at the normal viewing distance of approximately 30 cm.

In one example, all M grating elements 6 are of identical size. They cover the surface within the border 1 and are circular in form or are in the form of a regular polygon, with the diameter or a greatest diagonal measuring less than 0.3 mm. A square surface pattern with sides of 12 mm therefore means that M would have a value of over 1600.

Figure 2:
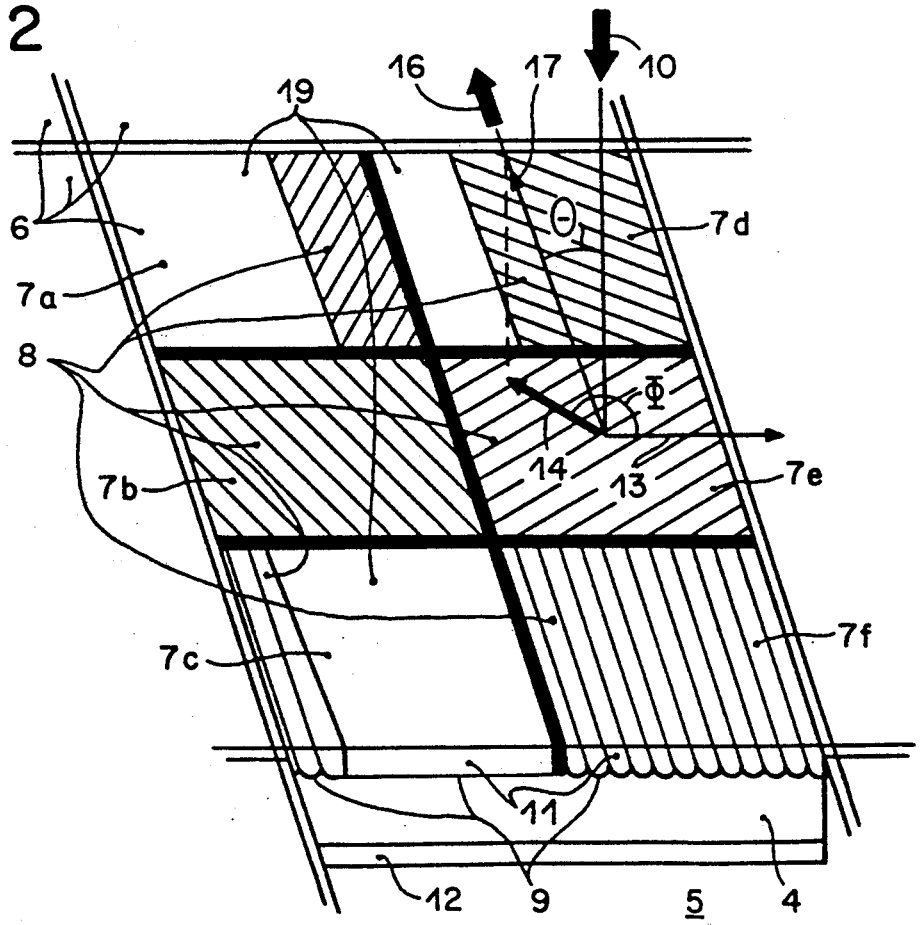
FIG. 2 shows the construction of a grating surface element in detail and the diffraction of incident light at a diffraction element incorporated into the grating surface element.

Each grating element 6 is divided into at least two grating element sub-portions 7 which are designated by the references 7a to 7f in FIG. 2. The preferred form of the grating element 6 is a regular polygon since these polygons are easily subdivided into other regular polygons of the grating element sub-portions 7 in a way that covers the surface. Triangles, quadrangles or hexagons are well suited.

Each grating element sub-portion 7 contains an optical diffraction element 8 comprising a microscopic grating structure 9 with a spacial frequency of over 100 lines per mm. The diffraction element 8 diffracts the incident light 10 in a manner which is predetermined by the relief structure 9.

For reasons of clarity in FIG. 2, one of the short sides of the central grating element 6 which is subdivided into six subportions 7a to 7f is shown in form of a sectional surface in order to show the structure of the support 4. Also for the sake of greater clarity, the grating elements 6 are indicated by a double separation line and the division into the sub-portions 7a to 7f by means of thick lines. In reality the divisions are defined only by the different relief structures 9.

The relief structures 9 of the surface pattern are embossed by means of an embossing die into the support 4 and are then covered with a protective layer 11. An optically active intermediary layer between the protective layer 11 and the relief structure 9 embossed into the support 4 determines the manner in which the surface pattern is to be viewed.

The surface pattern can be viewed in transmission if the protective layer 11 and the support 4 are made of optically transparent materials with different indices of refraction. The jump in index refraction at the boundary between the protective layer 11 and the support 4 acts as an optically active intermediate layer.

If the optically active layer intermediate is a thin reflecting metal layer made for example of aluminum, gold, nickel or silver, etc. applied on the support before or after embossing, the surface pattern can be viewed in reflection through the protective layer 11. The diffraction elements 8 reflect with great intensity the incident light 10 which has been modified by diffraction.

The support 4 can also be attached on non-transparent objects 5 and therefore has multiple uses. The support 4 can for example be provided with an adhesive layer 12 o the non-embossed side and can be applied in form of a self-adhesive label on the object 5 to be protected. When an attempt is made to separate the support 4 from the object 5, the adhesive forces of the adhesive layer 12 deform the support 4 with the relief structures 9 and thus destroy the surface pattern.

The surface pattern has a reference orientation 13 in the plane of the support 4. The direction of the orientation 14 of each relief structure 9 (e.g. the direction perpendicular to the grating lines if the relief structure 9 is a simple straight line grating) in relation to the reference orientation 13 can be defined by an azimuth angle $\Phi$ between the two directions 13 and 14.

When designing the surface pattern, its overall surface is divided into M grating surface elements 6, with each grating surface element 6 comprising in turn, N sub-portions 7a to 7f. The two numbers M and N are whole and are greater than 1.

The surface pattern contains N image representations 3, one of which is shown in FIG. 1. Each of the N image representations is divided into M pixels, depending on the division of the grating elements 6. Each of the N image representations assigns the pixel corresponding to a particular grating element 6 to one of the N sub-portions 7a to 7f comprising the particular grating element 6. Each pixel has as its parameters a color value and a brightness value for surface brightness.

In other words, the surface pattern includes N image representations 3, one of which is shown in FIG. 1. Each image representation can be seen from a different viewing direction (e.g. 15 of FIG. 1).

Each image representation 3 contains M pixels, with one pixel from each representation 3 corresponding to each grating element 6. Therefore, each grating element 6 is divided in N sub-portions 7 to define a pixel for each representation, with each sub-portion containing a diffraction element 8. The diffraction elements assigned to each representation define a viewing direction for the representation.

The direction of the incident light 10 falling upon the surface pattern (FIG. 2) and a viewing direction 15 (see FIG. 1) provided for the image representation 3, which is related to the orientation direction 14 and the color value of the pixel, determine the important parameters of the relief structure 9 of the diffraction element 8 assigned to the pixel concerned.

Insofar as the relief structures 9 are simple straight-line diffraction gratings, the spacial frequency, the azimuth angle $\Phi$ and the relief profile suffice as parameters of the relief structure 9. The spacial frequency and the wavelength of the light 10 determine the diffraction angle $\Phi$.

Asymmetric relief profiles are especially advantageous, as when the profile is appropriately shaped, the incident light 10 coming from a given direction is either diffracted almost completely on these profiles in a predetermined spacial direction 17 or a given ratio other than 1:1 can be attained between the intensities of the light diffracted into the plus first and into the minus first diffraction orders. This property of asymmetric relief profiles is described in the publication by R. Petit, Electromagnetic Theory of Gratings mentioned earlier, on pages 159ff.

The spacial direction 17 of diffracted light 16 is determined by the azimuth angle $\Phi$ and by the diffraction angle $\Phi$, whereby the azimuth angle $\Phi$ has a predetermined value within a range between 0° and 360°. With symmetric profiles the vertically incident light 10 is divided evenly between the two possible spacial directions 17 ($\theta$, $\Phi$ and $\theta$, $\Phi + 180°$). Symmetric relief profiles can be recognized in that each representation 3 is visible from two different viewing directions 15. With appropriately shaped asymmetric profiles on the other hand, each of the N representations 3 is visible only from one single viewing direction. A surface pattern with symmetric as well as asymmetric profile types is more expensive to produce but yields especially distinctive optical effects.

The spacial frequencies within a diffraction element 8 can be modulated, so that the diffracted light 16 is fanned out within a range of diffraction angles $\theta$. This is especially useful when the support 4 is very thin and the object 5 is not entirely flat, such as for example the paper of a crumpled bank note. The surface pattern remains easily visible despite the unevenness because part of the diffracted light 16 falls within the range of the diffraction angle 0 in the viewing direction 15 and thus compensates for the unevenness of the support.

The brightness values of N pixels assigned to a grating element 6, along with the predetermined direction of the incident light 10 and the viewing direction 15 determine the relative size of the N field portions 7a to 7f or determine the size of the diffraction surface of the diffraction element 8 in each of the N grating element sub-portions 7a to 7f if each grating surface element 6 is divided fixedly into N sub-portions 7a to 7f.

The light 16 diffracted at a predetermined angle θ has an intensity which, aside from illumination and viewing conditions and profile form, depends on the size of the active diffraction surface of the diffraction element 8 and the degree of active diffraction of the relief structure 9.

If for example the relative area of the N diffraction elements 8 in grating element 6 is determined by the brightness value of the pixel of each image representation 3, the grating elements 6 viewed under the predetermined direction 15 show differences in their relative brightness.

In another embodiment, the N sub-portions 7a to 7f of a grating element 6 are of identical size but the relief structures 9 are predetermined by a degree of active diffraction attributed to the brightness value of the pixel.

A predetermined pixel of each of the N different image representations 3 is attributed to each grating element 6 (FIG. 1). Each grating element 6 therefore contains a diffraction element 8 in each of the N sub-portions 7 which corresponds to the predetermined pixel of these N representations 3 and the relief structure 9 of which and the size of the diffraction element 8 of which are predetermined by the parameters of the pixel. Each grating element 6 therefore contains all the information concerning an attributed pixel of each of the N image representations.

Since each one of the N different image representations 3 has at least one attributed viewing direction 15, a viewer of the surface pattern sees only one of the N representations 3 under a non-diffuse illumination and in one of the N viewing directions 15. By tilting or rotating the support 4, all N representations 3 become visible one after the other to the viewer.

In FIG. 2, N=6, for example, because the surface pattern contains six image representations 3. The diffraction element 8 corresponding to the pixel of the first representation 3 is attributed to the grating element sub-portion 7a of the grating element 6. The sub-portion 7b forms a pixel of the second representation 3, and so forth. The N sub-portions 7a to 7f are of identical size. The diffraction element 8 corresponding to the relative brightness is smaller than or equal to the surface area of the sub-portions 7a to 7f. In FIG. 2 the diffraction elements 8 are indicated by hatch marks. A region 19 of the sub-portions 7a, 7c and 7d which is not taken up by the diffraction element 8 is completely smooth and reflects the incident light 10. Since the direction of the reflected light is determined by the law of reflection, its direction is also predetermined and may not coincide with any of the viewing directions 15, since the reflection interferes with the recognition of the image representation 3.

It is possible to emboss a matte structure in a region 19, said matte structure dispersing the incident light 10 evenly in all directions without interference, thanks to the low intensity, in the viewing of one of the N image representations 3.

The N image representations 3 can be different perspectives of one and the same object. It is possible, for example, for the direction of viewing of a particular view of the object to coincide with the N viewing directions 15. By changing the viewing direction 15, for example by rotating the surface pattern or by moving one's head, it is possible to obtain a suddenly different view of the object in the corresponding viewing direction 15, contrary to a hologram. If the object is a human face, for instance, the change in the object is especially noticeable to the observer.

In an embodiment only the shading of an object from a predetermined perspective changes in the N viewing directions 15, creating the impression of a change in the direction from which the object is illuminated.

Also individual figures, letters, company symbols, text portions, etc. which become visible to the observer one after the other according to the viewing direction 15 as the surface pattern is rotated are especially well suited for the N representations 3 corresponding to the N viewing directions 15.

When the surface pattern is used on a bank note of a multilingual country, each of the N representations 3 could show the value of the bank note in figures or in words in one of the country's languages.

The viewing directions 15 can be arranged in pairs so that the two viewing directions 15 of each pair coincide at normal viewing distance precisely with the extended axes of the two eyes of the viewer directed upon the surface pattern. If the representations 3 visible from the two viewing directions 15 constitute a stereoscopic pair of the same object, the viewer of the surface pattern receives a three-dimensional impression of the object in a viewing direction that is predetermined for each of these pairs.

Finally, the N image representations 3 corresponding to the N viewing directions 15 can show events in a time sequence. The viewer sees an action taking place in time as he rotates the surface pattern, whereby the image representations 3 corresponding to the viewing directions 15 become visible to him one after the other.

A black-and-white photograph of an object is an advantageous image representation 3, with the individual pixels having a brightness value of at least two levels.

The N representations 3 of the surface pattern can also be composed of the above-mentioned examples. In that case picture and text can be mixed. The limits are only set by the technically possible resolution into M×N field sub-portions 7 for a given spatial frequency.

The above-mentioned direction of the incident light 10 and the above-mentioned viewing directions 15 refer to a system of coordinates defined by the surface pattern, whereby the parameters of the relief structures 9 of the corresponding pixel are in each case selected in such manner for a fixed direction of the incident light 10 that a viewer moving his eyes around a surface pattern that is fixed in space perceives the described changes.

In another embodiment the given parameters of the relief structures 9 make it possible for the N representations 3 to become visible one after the other when the direction of the incident light 10 is fixed in space and when the viewer is immobile if the plane of the surface pattern is moved by tilting it around one of its axes. Here the direction of the incident light 10 and the viewing direction 15 change simultaneously in relation to the system of coordinates determined by the surface pattern.

Two especially distinctive consequences of seeing N image representations 3 one after the other when the vertical axis of the plane of the surface pattern is tilted are mentioned here as examples:

The perspective of the view of the object does not change with the tilting.

The perspective changes as if the object were rotating together with the surface pattern.

The production of the surface pattern can be effected in the steps described below, for example.

The N image representations 3 are first brought to the chosen dimensions by optical means, for example, and are broken down into pixels of identical size. The color value and the brightness value of each pixel is selected. The viewing direction 15 is then selected for each representation 3.

This information determines the parameters of the relief structure 9, the relative size of the diffraction element 8 and thereby the size of the region 19 for each sub-portion 7 in each grid element 6.

A master structure for the embossing die for the surface pattern can be produced with the equipment described in the above-identified U.S. Pat. No. 311,596. The two parameters of a relief structure 9, the spatial frequency and the profile form are determined by a die model used to form the diffraction surface element 8 on a surface element of a thermoplastic covering layer by means of the equipment. The third parameter determines the orientation direction 14 or the azimuth angle Φ around which the matrix must be rotated before molding. The steps to be carried out by this equipment for the production of the master structure of the surface pattern can be controlled by means of digital controls.

The matte structure of the surface portions 19 can be molded by a special die in the same manner as one of the relief structures 9, on the covering layer.

This process is preferably carried out by means of a computer program for the formation of the surface pattern.

It is also possible to mold the matte structure first on the surface of the covering layer, this being effected in the equipment according to the above-identified U.S. Pat. application Ser. No. 311,596 or in a prior, separate step, by means of embossing rollers. Subsequently the surface of the covering layer is re-embossed with the appropriate matrix for each diffraction surface 8.

Galvanically produced negatives for the embossing die are made from the master structure in a known manner (see U.S. Pat. No. 4,184,700) and the surface patterns are embossed and made ready.

Finally, the above-described embodiments of the invention are intended to be illustrative only. Numerous alternative embodiments may be devised by those skilled in the art without departing from the spirit and scope of the present invention.

I claim:

1. An article of manufacture including an optically varying surface pattern embossed into a support for making visible one out of a plurality of N image representations for each one out of $N(N>1)$ predetermined viewing directions, said optically varying surface pattern comprising $M(M>1)$ grid elements, each of said M grid elements being divided into N grid element sub-portions, each of said N grid element sub-portions of each of said M grid elements corresponding to a pixel of one of said N image representations and containing a diffraction element in the form of a relief structure with predetermined parameters for diffracting incident light, so that one of said N representations is visible from each one of said N predetermined viewing directions.

2. The article of claim 1 wherein at least one of said relief structure has an asymmetric relief profile and therefore has an azimuth angle in a range between 0° and 360°.

3. The article of claim 1 or 2 wherein each of said grid elements is in the form of a regular polygon whose longest diagonal is less than 0.3 mm.

4. The article as in one of the claims 1 or 2 wherein the relative area of the diffraction element of each of the N grid element sub-portions in each grid element is determined by the relative predetermined brightness of the corresponding pixel of each of the N image representations.

5. The article as in one of the claims 1 or 2 wherein the relative amount of diffraction of incident light of each of the N grid element sub-portions of each grid element is determined by the relative, predetermined brightness of the corresponding pixel for each of the N image representations.

6. The article as in claim 5, wherein each grid element comprises N grid element portions of equal size.

7. The article as in claim 6, wherein a region of each grid element portion not occupied by a diffraction element is occupied by a matte structure.

8. The article as in claim 1 wherein the N image representations are views of one and the same object from different, predetermined perspectives.

9. The article of claim 1 wherein the N image representations are images of one and the same object from a predetermined perspective of the object with said object being illuminated from different, predetermined directions.

10. The article as in claim 1 wherein the N representations are photographic images comprising pixels with at least two levels of the brightness value.

11. The article of claim 1 wherein N is an even number, and wherein the image representations include at least one stereoscopic pair of images of the same object, so that a threedimensional view of the object appears to the naked eye.

12. The article of claim 1 wherein said surface pattern is part of a larger, graphic motif and in that a border of said surface pattern is surrounded by said motif.

13. The article of claim 1 wherein said support onto which the surface pattern is embossed is provided with an adhesive surface on a non-embossed side.

14. The article of claim 1 wherein the largest spatial dimension of each of said grid elements is equal to or less than 0.3 mm and each of said relief structure has a spatial frequency of over 10 lines/mm.

* * * * *